F. T. MAURER.
SPRING WHEEL.
APPLICATION FILED JULY 22, 1910.

993,858.

Patented May 30, 1911.

2 SHEETS—SHEET 1.

Witnesses
Frank Hugh
U. B. Hillyard

Inventor
Frank T. Maurer,
By Victor J. Evans,
Attorney

F. T. MAURER.
SPRING WHEEL.
APPLICATION FILED JULY 22, 1910.
993,858.
Patented May 30, 1911.
2 SHEETS—SHEET 2.
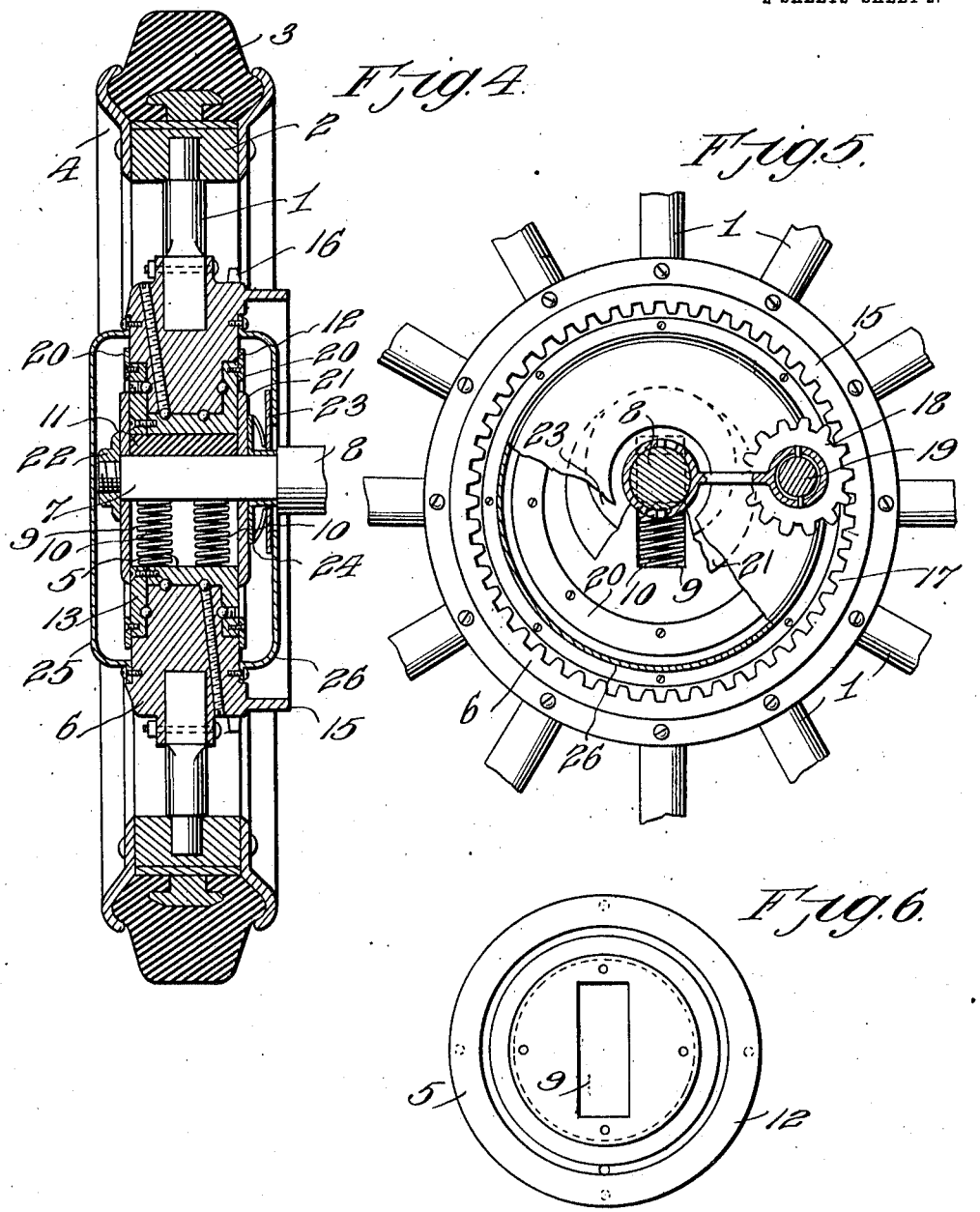

UNITED STATES PATENT OFFICE.

FRANK T. MAURER, OF KANSAS CITY, MISSOURI.

SPRING-WHEEL.

993,858.

Specification of Letters Patent.

Patented May 30, 1911.

Application filed July 22, 1910. Serial No. 573,300.

*To all whom it may concern:*

Be it known that I, FRANK T. MAURER, a citizen of the United States, residing at Kansas City, in the county of Jackson and State of Missouri, have invented new and useful Improvements in Spring-Wheels, of which the following is a specification.

The present invention provides a vehicle wheel designed chiefly for mechanically propelled machines but which may be utilized to advantage with vehicles of any type and propelled in any manner, the primary object being to combine all the advantages resulting from the use of pneumatic tires without being liable to the objections urged against such tires, namely, their liability to puncture and their comparatively short livedness.

The present invention supplies a wheel having a nonrotatable hub member and a ring encircling said hub member and rotatable thereon, said ring having the outer portion of the wheel connected therewith, the hub member being mounted upon the arm of the axle to yield vertically so as to absorb shock and vibration.

The invention consists of the novel features, details of construction and combination of parts, which hereinafter will be more particularly set forth, illustrated in the accompanying drawings, and pointed out in the appended claim.

Figure 1:
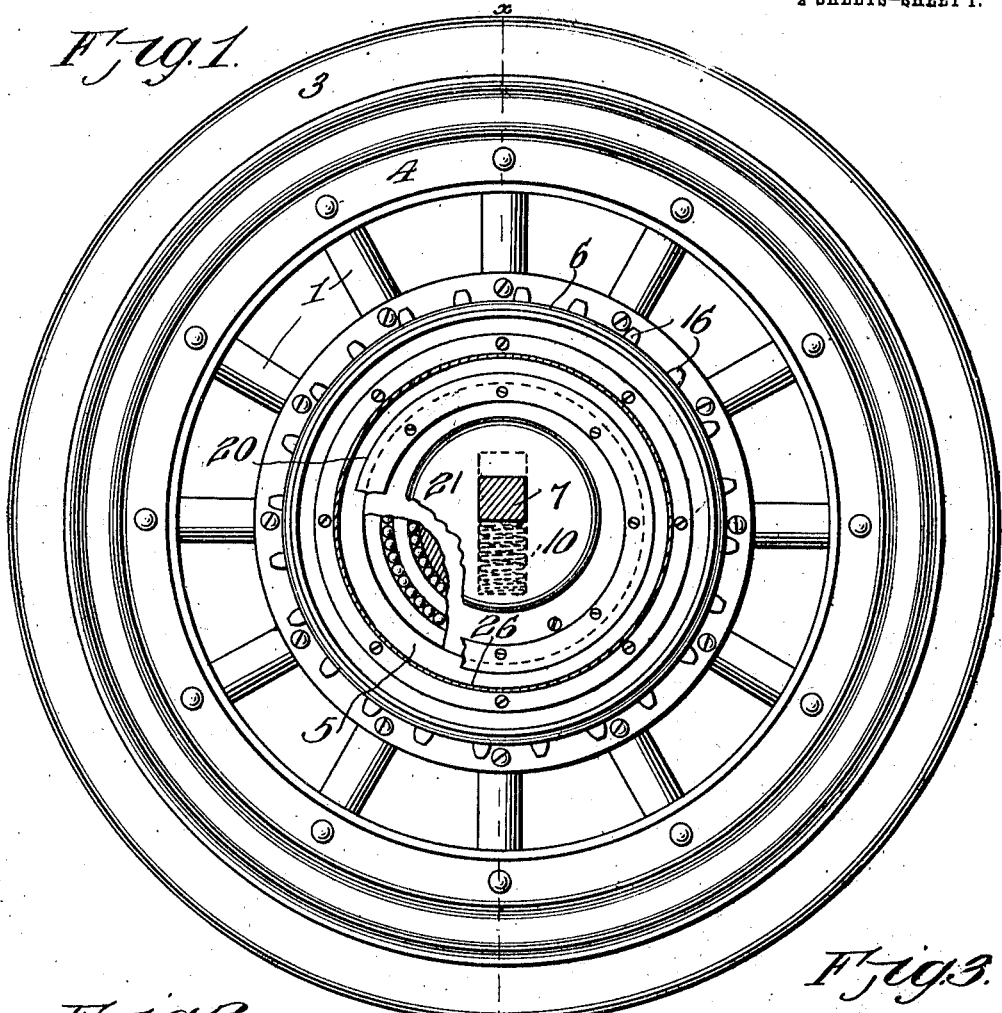
Figure 2:
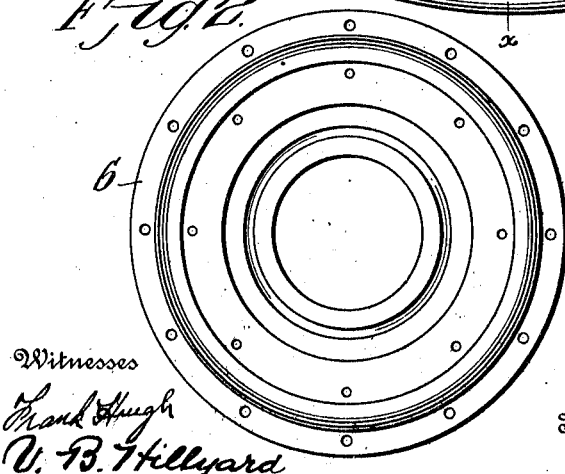
Figure 3:
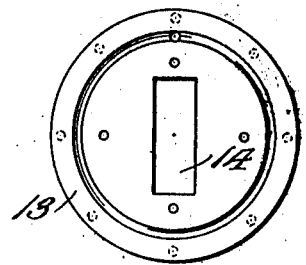

Referring to the drawings, forming a part of the application, Figure 1 is a side view of a vehicle wheel embodying the invention, parts being broken away. Fig. 2 is a view in elevation of the ring encircling the hub member. Fig. 3 is a view in elevation of the confining plate employed for securing the ring encircling the hub member to the latter. Fig. 4 is a vertical central section on the line *x—x* of Fig. 1. Fig. 5 is a detail view in elevation of the center portion of a wheel embodying a modification. Fig. 6 is a side view of the hub member.

Corresponding and like parts are referred to in the following description, and indicated in all the views of the drawings, by the same reference characters.

The wheel embodies center and outer portions which are connected by spokes 1. The outer portion consists of a felly 2, a tire 3 and side rings 4, the latter being fastened to opposite sides of the felly 2 and engaging opposite sides of the tire 3.

The center portion of the wheel comprises a hub member 5 and a ring 6, the latter encircling the hub member and rotatable thereon. The hub member 5 is mounted upon the arm 7 of the axle 8 so as to move vertically thereon only and is held against rotation. The axle arm 7 is of angular formation and fits within a vertically elongated opening 9 of the hub member so as to prevent rotation of said hub member but yet admit of its free vertical movements within certain limits. The opening 9 is of uniform width so that its opposite vertical walls may engage with opposite sides of the axle arm 7. Springs 10 are located in the lower portion of the opening 9 and support the axle arm 7 and are under tension to sustain the load. The springs 10 may be of any construction, such as commonly employed for sustaining heavy loads. A bumper 11 is located at the upper end of the opening 9 above the axle arm 7 and prevents noise and absorbs the shock incident to the axle arm striking the upper wall of the opening 9. The hub member 5 has a flange 12 at one side and a plate 13 is removably fitted to the opposite side and has a portion projecting beyond the surface of the hub member corresponding with the flange 12 so as to embrace opposite sides of the ring 6 and hold the same in place. The plate 13 is secured by machine screws or other fastenings to a side of the hub member 5 and has an opening 14 corresponding with the opening 9 of said hub member to receive the axle arm 7. Grooves are formed in the outer circumference of the hub member and other grooves are formed in the inner faces of the flange 12 and projecting portion of the plate 13 and these several grooves register with corresponding grooves formed in the inner circumference and in opposite sides of the ring 6 and provide ball races in which are fitted balls whereby the friction between the hub member 5 and the encircling ring 6 is reduced to the smallest amount possible.

The ring 6 has its inner portion reduced to receive the flange 12 and the outer portion of the plate 13, which serve to prevent lateral displacement of the ring and to hold the hub member 5 and ring 6 in proper position. The spokes 1 are let into sockets formed in the outer circumference of the ring 6. A circular flange 15 projects from a side of the ring 6 and constitutes one member of a brake appliance, whereby the speed of the wheel may be controlled. In the event of the wheel being used as a driver a series of sprocket teeth 16 are provided around the ring 6 to receive a drive chain. In the event of the wheel being constructed for a shaft driven machine the circular flange 15 is provided upon its inner side with a series of teeth 17, as indicated in the modification, Fig. 5, to mesh with a pinion 18 secured to a shaft 19 mounted in bearings supported by means of the axle 8. The joints formed between the ring 6 and the outer edges of the parts 12 and 13 are covered by means of rings 20, which latter are secured to one of the parts and are loose with reference to the other part. The joints protecting the rings 20 are fastened by preference to the parts 12 and 13 and overlap the part 6 and fit loosely against the sides thereof so as not to interfere with the rotation of the ring 6.

Cap plates 21 close opposite ends of the opening 9 and are mounted upon the axle arm 7 and fit close against opposite sides of the hub member. The cap plates 21 prevent any dust entering the opening 9 and also serve to confine a lubricant placed in said opening to facilitate movement of the parts and prevent heating thereof by frictional contact of the rubbing surfaces. The cap plates 21 fit the axle arm 7 snugly and move therewith. The wheel is retained in place by the axle nut 22 and by means of a plate 23 and a spring washer 24, the parts 23 and 24 being confined between the inner side of the wheel and the shoulder provided at the base or inner end of the axle arm 7. A cover plate 25 is secured to the ring 6 and further prevents entrance of dust into the joints and also confines any oil or lubricant that may tend to escape. A cover plate 26 is located upon the inner side of the wheel and is fastened at its outer edge to the ring 6. The center portion of the cover plate 26 is formed with a circular opening sufficient to admit of the outer portion of the wheel moving freely and this opening is closed by means of the plate 23, which is snugly fitted upon the axle arm or a hub extension of the spring washer 24.

In practice the hub member of the wheel is held from rotating upon the axle arm 7, but is free to move vertically thereon so as to compensate for jar and vibration. The outer portion of the wheel is free to move vertically with the hub member and in addition thereto is free to turn upon the hub member in either direction. A wheel of this character besides compensating for shock and vibration is also durable and capable of resisting lateral strain and while possessing in a degree the shock absorbing qualities of wheels equipped with pneumatic tires is also free from the objections urged against pneumatic tires which are short lived and susceptible to puncture and are the source of constant care to maintain the same in effective condition.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

In combination an axle having an arm of angular form in cross section, a wheel comprising a hub member and an outer portion rotatably mounted upon said hub member, the hub member having a vertically elongated opening to receive the axle arm and provided at one side with a flange to overlap the outer portion of the wheel, a plate secured to the opposite side of the hub member and overlapping the adjacent side of the outer portion of the wheel to retain the hub member and outer portion of the wheel in place, a spring support located in the lower portion of the opening of the hub member, a bumper arranged within the upper portion of the opening of said hub member, and cap plates closely fitting the axle and mounted thereon and embracing opposite sides of the hub member to close the ends of the opening formed therein, inner and outer cover plates secured to the rotatable part, the inner cover plate having a central opening, a plate snugly fitting the inner end of the axle arm and closing the opening in the inner cover plate, and a spring washer mounted upon the inner end of the axle arm between the two plates mounted thereon.

In testimony whereof I affix my signature in presence of two witnesses.

FRANK T. MAURER

Witnesses:
S. C. BARBOW,
WILLIAM CAMPBELL HORTON.